Sept. 28, 1954 D. CUONZ ET AL 2,690,309
REEL FOR FISHING RODS FOR LONG CASTS
Filed March 18, 1952 2 Sheets-Sheet 1
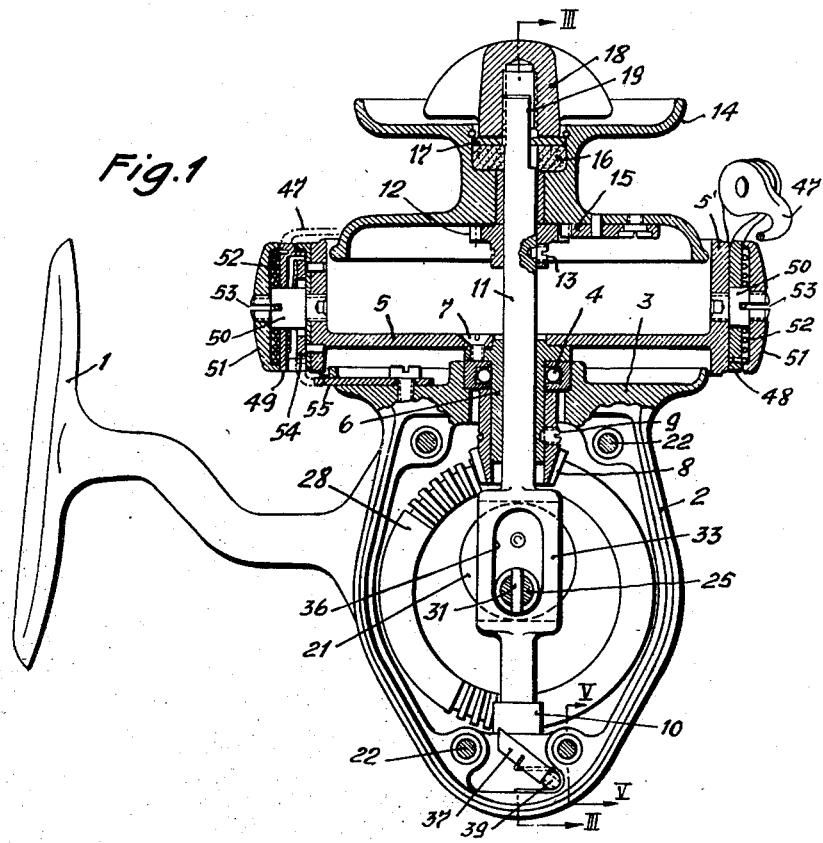
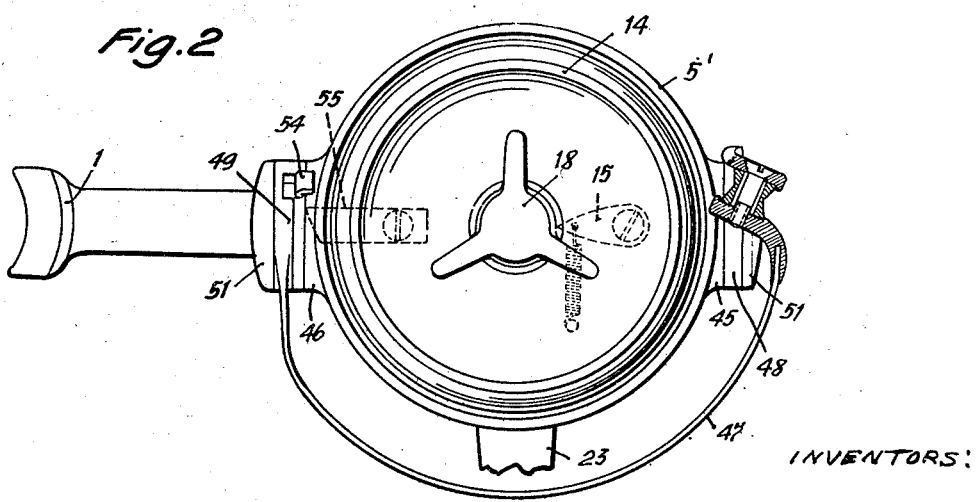
INVENTORS:
Daniel Cuonz
Rinaldo Tamborini
By Bryant & Lowry
attys.

Sept. 28, 1954   D. CUONZ ET AL   2,690,309
REEL FOR FISHING RODS FOR LONG CASTS
Filed March 18, 1952   2 Sheets-Sheet 2
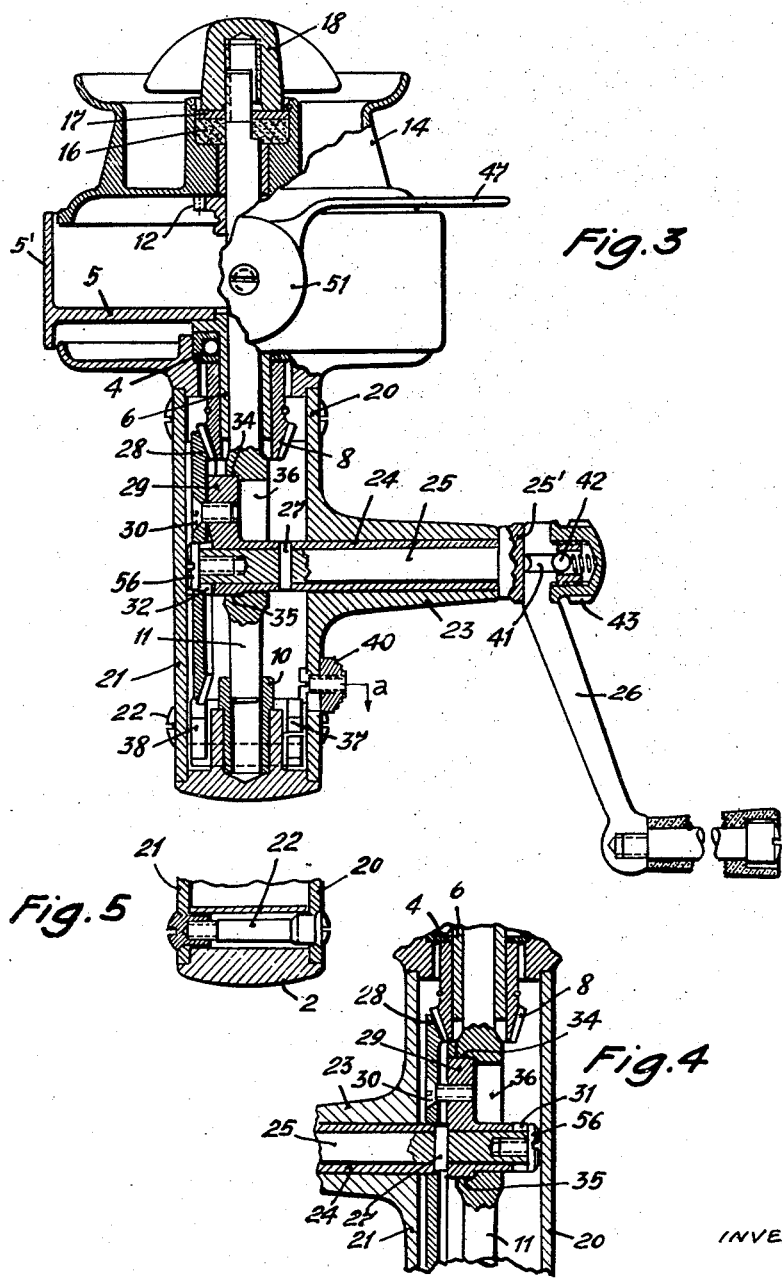

Patented Sept. 28, 1954

2,690,309

UNITED STATES PATENT OFFICE 2,690,309

REEL FOR FISHING RODS FOR LONG CASTS

Daniel Cuonz, Zurich, and Rinaldo Tamborini, Lugano, Switzerland

Application March 18, 1952, Serial No. 277,234

3 Claims. (Cl. 242—84.4)

Reels for fishing rods for long casts are known in many different forms, where a reel is actuated by a handle. These reels are made either for left-handed or for right-handed persons. There is a great need for a reel for long casts which could be used by left-handed persons as well as by right-handed persons.

The object of the present invention is a long-cast reel for fishing rods. According to the invention, this reel has as its characteristic feature a handle, and a driving device connected to this handle, which are fixed so that they may be be used on one or on the other side of the drive casing. The purpose of the construction is to enable the reel to be used by both left-handed and right-handed persons, by changing the position of the handle and of the driving device.

The drawing shows a possible construction of the object of the invention.

Fig. 1 is a side view of the reel for long casts; the side view is partly in section.

Fig. 2 is a plan view to Fig. 1.

Fig. 3 is a view of section III—III of Fig. 1.

Fig. 4 is a section, similar to Fig. 3, with the handle in the position for right-handed users.

Fig. 5 is a section along line V—V of Fig. 1.

The long-cast reel, which is fixed by means of a bracket 1 to the fishing rod, has a flat drive casing 2. The front end wall 3 of the casing has a housing for a ball race 4, which serves as a bearing for a tubular shaft 6 which supports the reel cup 5. The reel cup is connected to a flange of the tubular shaft by means of a screw 7. A bevel gear 8 is fixed by means of a screw 9 to the tubular shaft 6. A central shaft 11 can slide axially and rotate in the tubular shaft 6 and in bearing 10 opposite wall 3. A spur gear 12 is fixed by means of a set screw 13 to the front part of the central shaft and a line spool 14, adjacent to the spur wheel 12, can rotate on the central shaft. The line spool supports a pawl 15, which engages with the spur gear 12 and which allows rotation of the line spool in only one direction. An axial bore 16 in the hub of the line spool has a friction insert 16, made of rubber, leather, felt, or similar material, with a washer 17, and a wing nut 18 can be screwed against the washer. The end of the central shaft 11 has a flat portion 19, which prevents rotation of washer 17. When wing nut 18 is tightened, the friction insert 16 is pressed against the hub of the line spool and produces a braking effect on the latter. The line spool has a winding area which is conically tapered towards the front so as to enable the line to reel off easily and to ensure that the bait is thrown far. The flat sides of casing 2 are closed by means of two side plates 20 and 21, which, when the screws 22 are removed, can be taken out without difficulty and interchanged, if required. The plate 20 carries a boss 23 with a bush 24. The boss supports a driving shaft 25 with a handle 26. That part of the driving shaft which projects at the inside of the plate 20 has close to the end of bush 24 a pin 27, which goes right through the shaft, and a detachable bevel gear 28, which engages with bevel gear 8. A cam plate 29 is fixed by means of a screw 30 to bevel gear 28; part of the cam plate 29 forms the hub of bevel gear 28. At each of the end faces of the hub a diagonal slot 31 and 32 is milled out and one of these slots, according to the arrangement employed, engages with the pin 27 of the handle. The central shaft 11 is provided with a widened flat portion 33 with two opposite shoulders 34, 35. Part 33 engages with these shoulders with the cam profile and is guided by it, so that the central shaft 11 slides backwards and forwards when the handle shaft 25 rotates. Part 33 is also provided with an elongated hole 36, with handle shaft 25 passing through it. 37 and 38 are two pawls fixed on the same pin 39 and acting in opposite directions, under spring pressure; one of these pawls, depending on the side on which the handle is used, engages with the teeth of bevel gear 28. The engagement of one of the pawls with bevel gear 28 permits rotation of the handle 26 in one direction. 40 is a trip button which, when it is pushed in the direction of arrow a, disengages pawl 37 or 38 from the bevel gear, because the inner part of the button pushes the pawls to the back. In order to enable the handle to be turned inwards when it is not in use, it can be turned round in the bore in the head 25' of the handle shaft 25, and motion in the axial direction is prevented by a spring loaded ball 42, which engages with a circumferential groove 41 in the handle. A nut 43, screwed on the end of shaft 25, presses against an adjacent flat face 44 of the handle and prevents it from being turned inwards. When the nut 43 is partly screwed off, it is possible to turn the handle inwards. The line guide, made as a semi-circular bent wire 47, is pivoted on trunnions 50 by means of a bearing fork 48, 49, in two opposite holes 45, 46 of the winding cup rim 5'. Between the part 48, or 49 respectively, of the bearing fork and a cap 51 screwed on the trunnion pins 50, spiral springs 52 engage each with their inner ends with the parts 48 (or 49) of the line guide, so that one spring acts on part 48, the other spring on part 49. Thus the line guide is spring-loaded on both sides, so that its function is not affected, even if one spring breaks. 54 is the locking pawl and 55 the trip catch, which holds the locking pawl in position when the line guide is in the "off" position and the winding cup is rotating. 56 is a screw which fixes bevel gear 28 to the handle shaft 25.

In order to change the long-cast reel from the position for left-handed users (Figs. 1 to 3) to the position for right-handed users (Fig. 4) it is necessary, first of all, to take out the screws 22 and to remove the plates 20 and 21. Then screw 56 is removed. The two side plates are now interchanged so that the handle shaft, as shown in Fig. 4, is pushed from the other side into the hub of bevel gear 28, and fixed again with the aid of screw 56. Finally, the screws 22 are replaced, and this completes the change-over for right-handed users.

The advantage of driving the central shaft by means of the cam is that the cam cannot move out of its position or disengage even when it is under a heavy stress.

The ball race bearing of the winding cup ensures that it runs freely.

While there is herein shown and described the preferred embodiment of the invention, it is nevertheless to be understood that minor changes may be made therein, such as will fall within the scope of the invention as claimed.

Having thus described our invention, we claim as new and desire to secure by Letters Patent:

1. A reel for fishing rods for long casts, comprising in combination, a casing having removable side plates, a reel cup and line spool at one end of the casing, driving mechanism in the casing in communication with the reel cup and including a gear train having a bevel gear permanently positioned in the casing with its axis at substantially the transverse center line of the casing and adjacent one of said side plates and a handle rotatably carried by the other side plate and having a separable driving connection with said bevel gear, said plates being interchangeably positioned on said casing with the handle in driving communication with the bevel gear whereby the operating handle for the driving mechanism rotates the driving mechanism in the same direction when the side plate carrying the handle is placed on either side of the casing so that the reel may be used by either right-handed or left-handed persons.

2. A reel as in claim 1 the gear train including a second bevel gear on the reel cup engageable with the aforesaid bevel gear for rotating the reel cup, a longitudinal shaft journaled in the casing extending through the cup and interfittingly engaged with said line spool and coacting means carried by the first named bevel gear and shaft for effecting axial movement of the shaft and line spool during rotation of the line spool.

3. A reel as in claim 1 the gear train including a second bevel gear on the reel cup engaged with the aforesaid bevel gear for rotating the reel cup, a longitudinal shaft journaled in the casing extending through the cup and interfittingly engaged with said line spool, a cam element on the first named bevel gear and shoulders on the shaft engaged by said cam for effecting axial movement of the shaft and line spool during rotation of the line spool.

References Cited in the file of this patent

UNITED STATES PATENTS

| Number | Name | Date |
|---|---|---|
| 2,314,616 | Gaire | Mar. 23, 1943 |
| 2,498,972 | Duncan | Feb. 28, 1950 |

FOREIGN PATENTS

| Number | Country | Date |
|---|---|---|
| 402,597 | Great Britain | Dec. 7, 1932 |
| 924,148 | France | Mar. 3, 1947 |